(12) United States Patent
Konishi et al.

(10) Patent No.: US 7,872,084 B2
(45) Date of Patent: Jan. 18, 2011

(54) SUPPORT FOR SOLID-PHASE SYNTHESIS AND PROCESS FOR PRODUCING THE SAME

(75) Inventors: Tatsuya Konishi, Osaka (JP); Kenjiro Mori, Osaka (JP)

(73) Assignee: Nitto Denko Corporation, Osaka (JP)

( * ) Notice: Subject to any disclaimer, the term of this patent is extended or adjusted under 35 U.S.C. 154(b) by 525 days.

(21) Appl. No.: 11/834,132

(22) Filed: Aug. 6, 2007

(65) Prior Publication Data
US 2008/0039604 A1 Feb. 14, 2008
US 2010/0273969 A2 Oct. 28, 2010

(30) Foreign Application Priority Data
Aug. 8, 2006 (JP) .............................. 2006-215635

(51) Int. Cl.
*C08F 20/44* (2006.01)
*C08F 20/06* (2006.01)
*B65D 39/00* (2006.01)
*B32B 5/16* (2006.01)

(52) U.S. Cl. .................... 526/317.1; 526/285; 526/341; 526/346; 428/36.5; 428/327; 428/404; 521/30

(58) Field of Classification Search ................. 428/327, 428/36.5, 407; 526/317.1, 341, 346; 521/30
See application file for complete search history.

(56) References Cited

U.S. PATENT DOCUMENTS 5,910,554 A * 6/1999 Kempe et al. ............... 526/320
6,492,460 B2 12/2002 Haq et al.

FOREIGN PATENT DOCUMENTS

| JP | 58210914 A | 12/1983 |
| JP | 5023193 A | 2/1993 |
| JP | 5086132 A | 4/1993 |

OTHER PUBLICATIONS

Riqueza et al. "Modification of porous copolymer network based on acrylonitrile", Polymer Bulletin 48, 407-414, 2002.*

* cited by examiner

*Primary Examiner*—Michael M Bernshteyn
(74) *Attorney, Agent, or Firm*—Sughrue Mion, PLLC

(57) ABSTRACT

The present invention relates to a support for solid-phase synthesis, which contains a porous copolymer particle, the copolymer particle containing 25 to 60% by weight of an aromatic-vinyl structural unit, 20 to 55% by weight of a vinyl cyamide structural unit, 5 to 18% by weight of an ethylenically-unsaturated-carboxylic-acid structural unit, and 2 to 15% by weight of an aromatic-divinyl structural unit. The support according to the invention fluctuates little in the degree of swelling depending on the kind of the organic solvent in contact therewith.

9 Claims, No Drawings

US 7,872,084 B2

SUPPORT FOR SOLID-PHASE SYNTHESIS AND PROCESS FOR PRODUCING THE SAME

FIELD OF THE INVENTION

The present invention relates to a support for solid-phase synthesis which contains a porous resin particle and a process for producing the same. More particularly, the invention relates to a support for solid-phase synthesis which fluctuates little in the degree of swelling depending on the kind of the organic solvent in contact with the support, and to a process for producing the support.

BACKGROUND OF THE INVENTION

Porous polystyrene resin particles containing a hydroxystyrene/divinylbenzene copolymer have hitherto been known (see, for example, patent documents 1 to 3). These porous resin particles have been used as ion-exchange resins, adsorbents, etc. A purpose of the development of such porous resin particles for use as an ion-exchange resin, adsorbent, or the like has been to enhance the adsorbing ability per unit volume of the porous resin particles by imparting functional groups as much as possible to the porous resin particles and increasing the specific surface area of the porous resin particles as much as possible.

In recent years, a method of solid-phase synthesis using porous resin particles made of, e.g., a polystyrene/divinylbenzene copolymer or the like is known as one of promising methods of peptide synthesis (see, for example, patent document 4).

In the case where porous resin particles are used as such a support for solid-phase synthesis, the porous resin particles preferably swell in an organic solvent in some degree in order that a synthesized product can be obtained in a large amount on the support. However, in the case where chemical reactions are successively conducted on a support in various organic solvents as in, e.g., the ordinary solid-phase synthesis of peptides, the following problems arise when the porous resin particles swell in different degrees in the respective organic solvents. For example, when a support packed in a columnar reaction vessel having a constant capacity is used to conduct reactions in the manner as described above, a problem concerning pressure fluctuations, etc. during the reactions arises. In addition, there is a problem that the yield in the target synthesis reaction fluctuates due to the pressure fluctuations.

Consequently, in the technical field in which porous resin particles are used as a support for solid-phase synthesis, there is a desire for the development of porous resin particles which fluctuate little in the degree of swelling depending on the kinds of organic solvents.

Patent Document 1: JP-A-52-23193
Patent Document 2: JP-A-58-210914
Patent Document 3: JP-A-5-86132
Patent Document 4: U.S. Pat. No. 6,492,460

SUMMARY OF THE INVENTION

The invention has been achieved in order to meet the desire described above in the case of using porous resin particles as a support for solid-phase synthesis. An object of the invention is to provide a support for solid-phase synthesis containing a porous resin particle which fluctuates little in the degree of swelling depending on the kind of the organic solvent in contact therewith. Another object of the invention is to provide a process for producing the support.

DETAILED DESCRIPTION OF THE INVENTION

Namely, the present invention relates to the followings.

(1) A support for solid-phase synthesis, which comprises a porous copolymer particle,
 said copolymer particle comprising:
 25 to 60% by weight of an aromatic-vinyl structural unit,
 20 to 55% by weight of a vinyl cyamide structural unit,
 5 to 18% by weight of an ethylenically-unsaturated-carboxylic-acid structural unit, and
 2 to 15% by weight of an aromatic-divinyl structural unit, (2) The support according to (1), which has a carboxyl group in an amount within a range of 10 to 2.000 mmol/g.

(3) The support according to (1), which has an average particle diameter in a range of 1 to 1,000 μm and an average pore diameter in a range of 1 to 200 nm.

(4) The support according to (1), which has a specific surface area in a range of 0.1 to 500 $m^2/g$.

(5) A process for producing a support for solid-phase synthesis, which comprises:
 dissolving 25 to 60% by weight of an aromatic vinyl monomer, 20 to 55% by weight of a vinyl cyamide monomer, 5 to 18% by weight of an ethylenically unsaturated carboxylic acid monomer, and 2 to 15% by weight of an aromatic divinyl monomer in an organic solvent together with a polymerization initiator to prepare a monomer solution;
 dispersing the monomer solution in water in the presence of a dispersant; and
 polymerizing said monomers by suspension copolymerization to thereby obtain the support for solid-phase synthesis as a porous copolymer particle.

(6) The process according to (5), wherein the aromatic vinyl monomer is styrene.

(7) The process according to (5), wherein the vinyl cyamide monomer is acrylonitrile or methacrylonitrile.

(8) The process according to (5), wherein the ethylenically unsaturated carboxylic acid monomer is acrylic acid or methacrylic acid.

(9) The process according to (5), wherein the aromatic divinyl monomer is divinylbenzene.

The support for solid-phase synthesis containing a porous resin particle according to the invention fluctuates little in the degree of swelling in various organic solvents even when chemical reactions are conducted on the support successively in the various organic solvents. Consequently, synthesis reactions on the support can be efficiently conducted.

The support for solid-phase synthesis of the invention contains a porous copolymer particle containing 25 to 60% by weight of an aromatic-vinyl structural unit, 20 to 55% by weight of a vinyl cyamide structural unit, 5 to 18% by weight of an ethylenically-unsaturated-carboxylic-acid structural unit, and 2 to 15% by weight of an aromatic-divinyl structural unit.

This support for solid-phase synthesis can be prepared by dissolving 25 to 60% by weight of an aromatic vinyl monomer, 20 to 55% by weight of a vinyl cyamide monomer, 5 to 18% by weight of an ethylenically unsaturated carboxylic acid monomer, and 2 to 15% by weight of an aromatic divinyl monomer in an organic solvent together with a polymerization initiator to obtain a monomer solution, dispersing the monomer solution in water in the presence of a dispersant, and then polymerizing the monomers by suspension copolymerization.

Examples of the aromatic vinyl monomer include styrene, nucleus-alkylated styrenes such as o-methylstyrene, m-methylstyrene, p-methylstyrene, 2,4-dimethylstyrene, ethylstyrene, and p-t-butylstyrene, and α-alkyl-substituted styrenes such as α-methylstyrene and α-methyl-p-methylstyrene. Among these, styrene is preferably used.

As the vinyl cyamide monomer, it is preferred to use acrylonitrile or methacrylonitrile. As the ethylenically unsaturated carboxylic acid monomer, it is preferred to use acrylic acid or methacrylic acid. As the aromatic divinyl monomer, it is preferred to use divinylbenzene.

It is apparent that the aromatic-vinyl structural unit, vinyl cyamide structural unit, ethylenically-unsaturated-carboxylic-acid structural unit, and aromatic-divinyl structural unit in the support for solid-phase synthesis of the invention are derived from the respective monomers described above.

In the support for solid-phase synthesis of the invention, the amount of the vinyl cyamide structural units is in the range of 20 to 55% by weight, and preferably in the range of 23 to 50% by weight, based on all structural units. In a case where the amount of the vinyl cyamide structural units of is not in that range, the support obtained considerably fluctuates in the degree of swelling depending on the kind of the organic solvent in contact with the support.

The amount of the structural units of an ethylenically unsaturated carboxylic acid in the support for solid-phase synthesis of the invention is generally in the range of 5 to 18% by weight, and preferably in the range of 5 to 15% by weight, based on all structural units. In a case where the amount of the structural units of an ethylenically unsaturated carboxylic acid is smaller than 5% by weight based on all structural units, since this support has a reduced amount of carboxyl groups thereon, the amount of a synthesized product which can be obtained through a synthesis reaction becomes small. On the other hand, in a case where the amount of the structural units of an ethylenically unsaturated carboxylic acid is larger than 18% by weight, the distance between adjacent carboxyl groups is so short that there is a possibility that adjacent chemical reactions occurring on the support might be inhibited by each other to yield a synthesized product having a reduced purity.

The amount of the aromatic-divinyl structural units in the support for solid-phase synthesis of the invention is generally in the range of 2 to 15% by weight, and preferably in the range of 5 to 15% by weight, based on all structural units. In a case where the amount of the aromatic-divinyl structural units is smaller than 2% by weight, the specific surface area of the support for solid-phase synthesis obtained is so small that the amount of a synthesized product to be obtained through a synthesis reaction is small. On the other hand, in a case where the amount of the aromatic-divinyl structural units is larger than 15% by weight, the support for solid-phase synthesis obtained has a reduced degree of swelling in organic solvents and, hence, the amount of a synthesized product to be obtained is small.

Consequently, the amount of the aromatic-vinyl structural units in the support for solid-phase synthesis of the invention is in the range of 25 to 60% by weight, and preferably in the range of 30 to 57% by weight, based on all structural units.

The support for solid-phase synthesis of the invention has carboxyl groups generally in an amount in the range of to 2,000 μmol/g, preferably in an amount in the range of 50 to 1,500 μmol/g. In a case where the amount of carboxyl groups possessed by the support for solid-phase synthesis is smatter than 10 μmol/g, the amount of a synthesized product to be obtained on this support for solid-phase synthesis is small. On the other hand, in a case where the amount of carboxyl groups possessed by the support for solid-phase synthesis is larger than 2,000 μmol/g, the distance between adjacent carboxyl groups present on the support is so short that there is a problem that adjacent chemical reactions occurring on the support are apt to be inhibited by each other and use of this support for solid-phase synthesis results in a synthesized product having a reduced purity.

The size and shape of the support of the invention are not particularly limited. However, the average particle diameter thereof is generally in the range of 1 to 1,000 μm, preferably in the range of 5 to 500 μm, and most preferably in the range of 10 to 300 μm. In a case where the average particle diameter of the support for synthesis is smaller than 1 μm and this support for synthesis is packed in a column and used, this arouses a trouble that a back pressure becomes too high or a liquid feed rate becomes low. On the other hand, in case where the average particle diameter of the support for synthesis is larger than 1,000 μm and this support for synthesis is packed in a column, spaces among the support particles become large and it is difficult to efficiently pack the support particles in a column having a given capacity.

The specific surface area of the support for synthesis of the invention is in the range of generally 0.1 to 500 $m^2/g$, preferably in the range of 10 to 300 $m^2/g$, and most preferably in the range of 50 to 200 $m^2/g$. In a case where the specific surface area thereof is smaller than 0.1 $m^2/g$, the reaction field available for chemical synthesis reactions is small, resulting in a possibility that the amount of a synthesized product to be obtained might be small. On the other hand, in a case where the specific surface area thereof is larger than 500 $m^2/g$, this support has many fine pores and/or has a high porosity. When the support has many fine pores, there is a possibility that synthesis reactions might be less apt to proceed with this support for synthesis. When the porosity is too high, the support for synthesis has low strength and may pose a problem concerning handling.

The pores possessed by the support for solid-phase synthesis of the invention have an average diameter generally in the range of 1 to 200 nm, preferably in the range of 5 to 150 nm, and most preferably in the range of 110 to 100 nm. In a case where the average pore diameter thereof is smaller than 1 nm, use of this support for solid-phase synthesis results in a possibility that reactants might not immediately infiltrate into inner parts of the support and, hence, desired synthesis reactions might be less apt to take place. As a result, the amount of a target product to be synthesized may be small. Furthermore, when the synthesized product is to be separated from the support after the synthesis reaction, it is difficult to recover the synthesized product present in inner parts of the support and this may result in a reduced yield. On the other hand, average pore diameters larger than 200 nm are undesirable because this porous resin has a small specific surface area and a reactant has a small chance of coming into contact with a carboxyl group on the surface of the support for solid-phase synthesis as a reaction field.

Methods for producing the support for solid-phase synthesis of the invention are not particularly limited. For example, the support may be produced by suspension-copolymerizing the monomers described above by any ordinary and conventional method. Namely, the support for solid-phase synthesis of the invention can be obtained in the following manner. In an organic solvent are dissolved 25 to 60% by weight of an aromatic vinyl monomer, 20 to 55% by weight of a vinyl cyamide monomer, 5 to 18% by weight of an ethylenically unsaturated carboxylic acid monomer, and 2 to 15% by weight of an aromatic divinyl monomer together with a polymerization initiator to prepare a monomer solution. This monomer solution is subsequently dispersed in water in the presence of a dispersant. The monomers dispersed are copolymerized with stirring at, for example, 60 to 90° C. for 0.5 to 48 hours, although such conditions are not particularly limited. Thereafter, the particles formed are optionally classified, and the copolymer thus obtained is taken out by filtration, followed by drying. Thus, the target support can be obtained as a powder composed of porous resin particles made of the copolymer.

More specifically, the procedure is as follows. The respective monomers are dissolved in a suitable organic solvent and this solution is suspended as minute droplets in water using a suitable dispersant. The monomers are then copolymerized in these droplets. As the organic solvent, it is preferred to use, for example, a hydrocarbon or an alcohol. Examples of the hydrocarbon include aliphatic, saturated or unsaturated hydrocarbons and aromatic hydrocarbons. Preferred of these are aliphatic hydrocarbons having 5 to 12 carbon atoms, such as n-hexane, n-heptane, n-octane, isooctane, undecane, and dodecane.

By using an alcohol in combination with such an aliphatic hydrocarbon, more porous resin particles can be obtained. Examples of the alcohol include aliphatic alcohols. Preferred of these are ones in which the alkyl group has 5 to 12 carbon atoms, such as 2-ethylhexyl alcohol, t-amyl alcohol, nonyl alcohol, 2-octanol, decanol, lauryl alcohol, and cyclohexanol.

The amount of the organic solvent to be used in the suspension copolymerization is generally 0.5 to 2.0 times, and preferably 0.3 to 1.5 times, the total weight of the monomers. In a case where the organic solvent is used in an amount outside the range, the porous resin particles obtained have a small specific surface area and the amount of a synthesized product to be obtained through a synthesis reaction is small. Such solvent amounts are hence undesirable. The dispersant also is not particularly limited, and conventional dispersants may be used. Examples thereof include hydrophilic protective colloid agents such as polyvinyl alcohol), polyvinylpyrrolidone, poly(acrylic acid), gelatin, starch, and carboxymethyl cellulose; and sparingly-soluble inorganic powders such as calcium carbonate, magnesium carbonate, calcium phosphate, barium sulfate, calcium sulfate, and bentonite. Although the amount of such a dispersant to be used is not particularly limited, it is generally in the range of 0.01 to 10% by weight based on the weight of the water to be used for the suspension polymerization.

The polymerization initiator also is not particularly limited and conventional ones may be used. Examples thereof include peroxides such as dibenzoyl peroxide, dilauroyl peroxide, distearoyl peroxide, 1,1-di(t-butylperoxy)-2-methylcyclohexane, 1,1-di(t-hexylperoxy)-3,3,5-trimethylcyclohexane, 1,1-di(t-hexylperoxy)cyclohexane, 1,1-di(t-butylperoxy)cyclohexane, di-t-hexyl peroxide, t-butyl cumyl peroxide, di-t-butyl peroxide, 1,1,3,3-tetramethylbutyl peroxy-2-ethylhexanoate, t-hexyl peroxy-2-ethylhexanoate, t-butyl peroxy-2-ethylhexanoate, and t-butyl peroxyisopropyl monocarbonate; and azo compounds such as 2,2'-azobisisobutyronitrile, 2,2'-azobis-2-methylbutyronitrile, and 2,2-azobis-2,4-dimethylvaleronitrile.

In conducting the suspension polymerization described above, a diamine, diol, amino alcohol, aminocarboxylic acid, or the like may be bonded to carboxyl groups of the copolymer through ester bonds or amide bonds by an appropriate conventional technique.

The support for solid-phase synthesis of the invention thus obtained is suitable for use as a support for various chemical synthesis reactions. According to the support for solid-phase synthesis of the invention, even when it is used in a series of synthesis reaction steps in which two or more organic solvents are used while replacing one organic solvent with another, the degrees of swelling thereof in the respective organic solvents differ little from each other. Accordingly, even when various organic solvents are used to conduct various synthesis reactions in a columnar reaction vessel having a constant capacity, pressure fluctuations depending on the organic solvents used are small.

Synthesis reactions to which the support for solid-phase synthesis of the invention can be applied are not limited at all. However, the support is suitable for use in, e.g., the synthesis of peptides, oligonucleotides, sugar chains, glycopeptides, and derivatives thereof. In particular, the support can be effectively used for the synthesis of oligonucleotides and derivatives thereof.

In this connection, the synthesis of an oligonucleotide using the support for solid-phase synthesis of the invention can be conducted by conventional methods. For example, a linker is combined with carboxyl groups of the support for solid-phase synthesis of the invention and amidites are then combined stage by stage with the ends of the linker molecules so as to result in a given base sequence. This synthesis reaction can be conducted with an automatic synthesizing apparatus. For example, various organic solvents including acetonitrile and amidite solutions are successively sent to that flow reactor in an apparatus which is packed with the support for solid-phase synthesis with which a linker has been combined. Thus, a reaction is repeated. Finally, the linker moiety is cleaved by, e.g., hydrolysis, whereby a target oligonucleotide can be obtained. As the linker, a conventional one may be suitably used. Examples of the support for solid-phase synthesis of the invention which has, for example, a nucleoside linker combined therewith include one represented by the following formula:

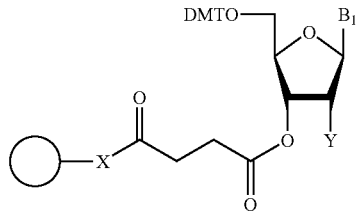

(in which, the open circle (o) represents the support for solid-phase synthesis of the invention; DMT represents dimethoxytrityl as a 5'-position protective group; $B_1$ represents a base; X represents N, O or C=O; and Y represents H, F, or OH, which may be protected with an appropriate protective group).

EXAMPLES

The invention will be explained below in detail by reference to Examples according to the invention. However, the invention should not be construed as being limited by the following Examples in any way.

Example 1

A separable flask having a capacity of 500 mL and equipped with a condenser, stirrer, and nitrogen introduction tube was placed on a thermostatic water bath. Into this flask were introduced 2.5 g of poly(vinyl alcohol) (manufactured by Kuraray Co., Ltd.) and 250 g of distilled water. The contents were stirred to dissolve the polymer.

Separately, 22 g of styrene, 24 g of methacrylonitrile, 7 g of methacrylic acid, 7 g of divinylbenzene (55%), 60 g of 2-ethylhexanol, 24 g of isooctane, and 1 g of benzoyl peroxide (containing 25% water) were mixed together and dissolved. The solution obtained was introduced into the separable flask. In a nitrogen stream, the contents were stirred at room temperature and then heated to 80° C. to conduct suspension copolymerization for 8 hours. After completion of the polymerization reaction, the copolymer particles obtained were taken out by filtration, washed with distilled water and acetone, and then dispersed in acetone so as to result in a total amount of about 1 L.

This copolymer dispersion was allowed to stand and the supernatant acetone was discarded. Thereafter, acetone was added again to the sediment to adjust the total amount to about 500 mL. The operation including allowing the resultant dispersion to stand, followed by discarding the acetone was repeated to conduct classification. The copolymer particles were taken out of this dispersion and then vacuum-dried. Thus, a support for solid-phase synthesis containing a porous particle of a styrene/methacrylonitrile/methacrylic acid/divinylbenzene copolymer was obtained as a powder.

Example 2

The same procedure as in Example 1 was conducted, except that use was made of 29 g of styrene, 21 g of methacrylonitrile, 4 g of acrylic acid, 7.3 g of divinylbenzene (55%), 58 g of 2-ethylhexanol, 22 g of isooctane, and 1.2 g of benzoyl peroxide (containing 25% water). Thus, a support for solid-phase synthesis containing a porous particle of a styrene/methacrylonitrile/acrylic acid/divinylbenzene copolymer was obtained as a powder.

Example 3

The same procedure as in Example 1 was conducted, except that use was made of 34 g of styrene, 14 g of methacrylonitrile, 4 g of methacrylic acid, 6.6 g of divinylbenzene (55%), 58 g of 2-ethylhexanol, 25 g of isooctane, and 1.1 g of benzoyl peroxide (containing 25% water). Thus, a support for solid-phase synthesis containing a porous particle of a styrene/methacrylonitrile/methacrylic acid/divinylbenzene copolymer was obtained as a powder.

Example 4

The same procedure as in Example 1 was conducted, except that use was made of 18 g of styrene, 30 g of methacrylonitrile, 5 g of methacrylic acid, 7.0 g of divinylbenzene (55%), 55 g of 2-ethylhexanol, 23 g of isooctane, and 1.2 g of benzoyl peroxide (containing 25% water). Thus, a support for solid-phase synthesis containing a porous particle of a styrene/methacrylonitrile/methacrylic acid/divinylbenzene copolymer was obtained as a powder.

Comparative Example 1

The same procedure as in Example 1 was conducted, except that use was made of 49 g of styrene, 4 g of p-acetoxystyrene, 7 g of divinylbenzene (55%), 55 g of 2-ethylhexanol, 23 g of isooctane, and 1 g of benzoyl peroxide (containing 25% water). Thus, porous resin particles containing a styrene/p-acetoxystyrene/divinylbenzene copolymer were obtained.

Into a separable flask having a capacity of 500 mL and equipped with a condenser and a stirrer were introduced an aqueous solution prepared by dissolving 40 g of the porous copolymer particles, 260 g of ethanol, and 2 g of sodium hydroxide in 65 g of distilled water. The contents were reacted for 5 hours at an oil bath temperature of 80° C. After the reaction, the particles were washed with distilled water, acetone, and methanol, taken out by filtration, and vacuum-dried. Thus, a support for solid-phase synthesis containing a porous particle of a styrene/hydroxystyrene/divinylbenzene copolymer was obtained as a powder.

Comparative Example 2

The same procedure as in Example 1 was conducted, except that use was made of 39 g of styrene, 9 g of methacrylonitrile, 4 g of methacrylic acid, 6.5 g of divinylbenzene (55%), 57 g of 2-ethylhexanol, 20 g of isooctane, and 1.1 g of benzoyl peroxide (containing 25% water). Thus, a support for solid-phase synthesis containing a porous particle of a styrene/methacrylonitrile/methacrylic acid/divinylbenzene copolymer was obtained as a powder.

Comparative Example 3

The same procedure as in Example 1 was conducted, except that use was made of 12 g of styrene, 36 g of methacrylonitrile, 6 g of methacrylic acid, 7.0 g of divinylbenzene (55%), 58 g of 2-ethylhexanol, 22 g of isooctane, and 1.2 g of benzoyl peroxide (containing 25% water). Thus, a support for solid-phase synthesis containing a porous particle of a styrene/methacrylonitrile/methacrylic acid/divinylbenzene copolymer was obtained as a powder.

With respect to each of the supports for solid-phase synthesis obtained in Examples 1 to 4 and Comparative Examples 1 to 3, the amount of methacrylonitrile structural units in all structural units was determined from a nitrogen content determined by elemental analysis. Furthermore, the average particle diameter was determined with a laser diffraction/scattering type particle size distribution analyzer (LA-920, manufactured by Horiba, Ltd.) and the amount of carboxyl groups was determined with an automatic conductometric titrator employing an aqueous potassium hydroxide solution. Moreover, the average pore diameter and the specific surface area were determined with a porosimeter (Pore Master 60-GT, manufactured by Quanta Chrome). Namely, about 0.2 g of a test sample was introduced into the mercury porosimeter and the average pore diameter and specific surface area of the sample were determined from mercury injection pressures under the conditions with a mercury contact angle of 140° and a mercury surface tension of 480 dyne/cm.

The degree of swelling was determined in the following manner. Namely, 0.5 g of a support for solid-phase synthesis was placed in a 10-mL measuring cylinder to measure the apparent volume (dry volume) Vo thereof. Subsequently, a largely excessive amount of toluene, acetonitrile, or ethyl acetate was introduced into the measuring cylinder and this cylinder was allowed to stand at room temperature for 24 hours to swell the support for solid-phase synthesis. Thereafter, this support in a swollen state was examined for apparent volume (swollen volume) Vs. The degree of swelling S was determined from Vs/Vo. The results of these examinations are summarized in Table 1.

TABLE 1

| | Example | | | | Comparative Example | | |
|---|---|---|---|---|---|---|---|
| | 1 | 2 | 3 | 4 | 1 | 2 | 3 |
| Amount of methacrylonitrile structural units (wt %) | 33 | 29 | 22 | 46 | — | 13 | 56 |
| Average particle diameter (μm) | 60 | 100 | 120 | 75 | 88 | 67 | 72 |
| Average pore diameter (nm) | 77 | 60 | 16 | 60 | 55 | 17 | 144 |
| Specific surface area (m$^2$/g) | 101 | 119 | 105 | 79 | 129 | 68 | 53 |
| Amount of carboxyl groups (μmol/g) | 1219 | 311 | 157 | 808 | — | 120 | 919 |
| Degree of swelling | | | | | | | |
| Toluene | 2.3 | 2.2 | 2.0 | 2.7 | 2.0 | 1.6 | 2.7 |
| Acetonitrile | 2.3 | 2.4 | 2.2 | 2.7 | 1.1 | 2.3 | 1.7 |
| Ethyl acetate | 2.5 | 2.6 | 2.3 | 2.6 | 1.4 | 1.9 | 2.7 |

As apparent from the results given in Table 1, the supports for solid-phase synthesis of the invention, although relatively high in the degree of swelling in organic solvents in contact therewith, fluctuate little in the degree of swelling depending on the different organic solvents.

While the present invention has been described in detail and with reference to specific embodiments thereof, it will be apparent to one skilled in the art that various changes and modifications can be made therein without departing from the scope thereof.

This application is based on Japanese patent application No. 2006-215635 filed Aug. 8, 2006, the entire contents thereof being hereby incorporated by reference.

Further, all references cited herein are incorporated in their entireties.

What is claimed is:

1. A support for solid-phase synthesis, which comprises a porous copolymer particle, said copolymer particle comprising:
   25 to 60% by weight of an aromatic-vinyl structural unit,
   20 to 55% by weight of a vinyl cyamide structural unit,
   5 to 18% by weight of an ethylenically-unsaturated carboxylic acid structural unit, and
   2 to 15% by weight of an aromatic-divinyl structural unit.

2. The support according to claim 1, which has a carboxyl group in an amount within a range of 10 to 2,000 μmol/g.

3. The support according to claim 1, which has an average particle diameter in a range of 1 to 1,000 μm and an average pore diameter in a range of 1 to 200 nm.

4. The support according to claim 1, which has a specific surface area in a range of 0.1 to 500 m$^2$/g.

5. A process for producing the support for solid-phase synthesis of claim 1, which comprises:
   dissolving 25 to 60% by weight of an aromatic vinyl monomer, 20 to 55% by weight of a vinyl cyamide monomer, 5 to 18% by weight of an ethylenically unsaturated carboxylic acid monomer, and 2 to 15% by weight of an aromatic divinyl monomer in an organic solvent together with a polymerization initiator to prepare a monomer solution;
   dispersing the monomer solution in water in the presence of a dispersant; and
   polymerizing said monomers by suspension copolymerization to thereby obtain the support for solid-phase synthesis as a porous copolymer particle.

6. The process according to claim 5, wherein the aromatic vinyl monomer is styrene.

7. The process according to claim 5, wherein the vinyl cyamide monomer is acrylonitrile or methacrylonitrile.

8. The process according to claim 5, wherein the ethylenically unsaturated carboxylic acid monomer is acrylic acid or methacrylic acid.

9. The process according to claim 5, wherein the aromatic divinyl monomer is divinylbenzene.

* * * * *